J. J. Dutcher,
Eel Trap.
No. 113,278. Patented Apr. 4, 1871.

Witnesses:
C. Raettig
L. S. Mabee

Inventor
J. J. Dutcher
per Munn & Co.
Attorneys.

United States Patent Office.

JOSIAH J. DUTCHER, OF NEW HAVEN, CONNECTICUT, ASSIGNOR TO GODFREY W. DUTCHER, OF SAME PLACE.

Letters Patent No. 113,278, dated April 4, 1871.

IMPROVEMENT IN EEL-TRAPS FOR WATER-PIPES.

The Schedule referred to in these Letters Patent and making part of the same.

*To all whom it may concern:*

Be it known that I, JOSIAH J. DUTCHER, of New Haven, in the county of New Haven and State of Connecticut, have invented a new and improved Eel-Trap for Water-Pipes; and I do hereby declare that the following is a full, clear, and exact description thereof which will enable others skilled in the art to make and use the same, reference being had to the accompanying drawing forming part of this specification.

Figure 1:
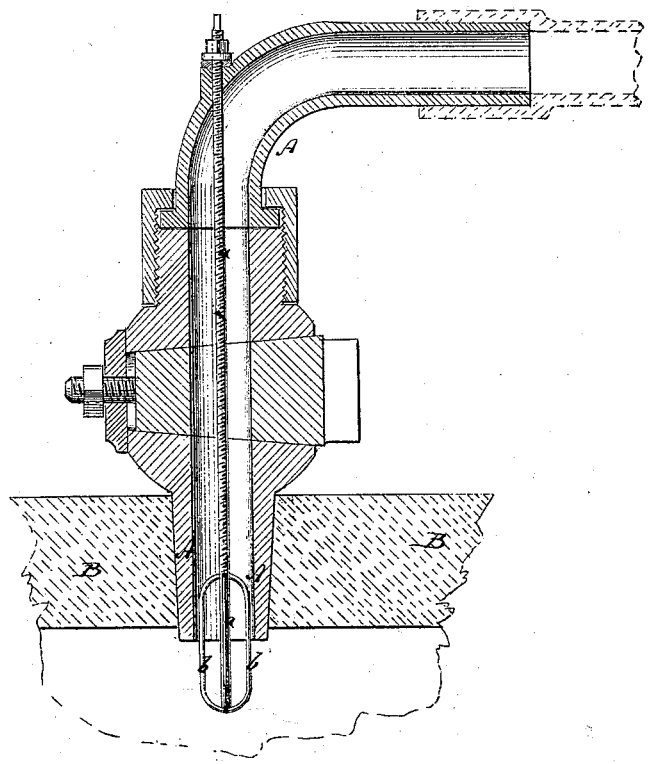
Figure 2:
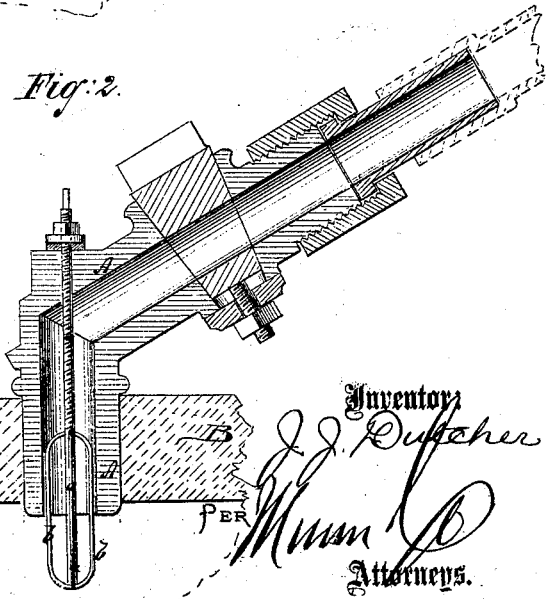

Figures 1 and 2 are sectional views of taps and drives for water-pipes provided with my improved eel-trap.

Similar letters of reference indicate corresponding parts.

The object of this invention is to provide an eel-trap at the extreme end of the water-pipe let into a main or reservoir, so that the eels cannot enter a portion of the pipe.

Eel-traps were heretofore fitted into the pipes near to the cocks placed at their ends, and were basket-shaped, of wire. They were quite effectual in their places, but did not keep eels out of the extreme ends of the pipes, which were, in consequence, frequently blocked and stopped up by said animals. It is a matter of extreme trouble and expense to take up the pipes and remove the animals that clog them.

To prevent this I affix an eel-trap in the extreme inner end of the pipe, by securing a number of wires to the rod that enters the tap or drive, making it therefore impossible for an animal of such size that it could stop the pipe to enter the same.

A in the drawing represents a portion of a water-pipe driven into a main-pipe, B, or fitted into a suitable water-reservoir.

The pipe A can be of suitable form, according to the manner in which it is to be applied, either as in figs. 1 and 2, or otherwise.

The extreme end of the pipe A, where it enters the reservoir, surrounds a central rod, $a$, which is screwed into it, or otherwise secured, in the ordinary manner.

Such rods were heretofore used, and had the object of clearing the end of the pipes from obstructions produced by the piercing of the main pipe.

I affix to the lower part of the rod $a$ an eel-trap, in form of a set of wires $b\ b$, which project against the inner circumference of the pipe, so as to subdivide the annular space for the entrance of the water into sections too small for eels of sufficient diameter to clog the pipe.

This eel-trap projects partly beyond the end of the pipe A, as shown, and serves, therefore, as a complete protection for the whole length of the pipe.

It will be observed that before the cock, shown in fig. 1, can be turned, it will be necessary to draw the trap upward above the cock, by means of the rod $a$, which operation is easily effected.

The trap, instead of being made of wires placed longitudinally, as shown, may be formed of upright, or spiral, or other rods, in equivalent manner.

Having thus described my invention,

I claim as new and desire to secure by Letters Patent—

An eel-trap, applied to the water-pipe so as to project beyond the inner end of the same into the main or reservoir, as specified.

JOSIAH J. DUTCHER.

Witnesses:
J. A. WOOD,
H. L. HOTCHKISS.